United States Patent
Yoshida et al.

(10) Patent No.: US 10,486,240 B2
(45) Date of Patent: Nov. 26, 2019

(54) NUMERICAL CONTROLLER HAVING CUTTING CONTROL FUNCTION THROUGH TURRET ROTATION

(71) Applicant: FANUC CORPORATION, Minamitsuru-gun, Yamanashi (JP)

(72) Inventors: Kouei Yoshida, Yamanashi (JP); Yousuke Koyanaka, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 110 days.

(21) Appl. No.: 15/402,665

(22) Filed: Jan. 10, 2017

(65) Prior Publication Data
US 2017/0203371 A1    Jul. 20, 2017

(30) Foreign Application Priority Data

Jan. 15, 2016   (JP) ................................ 2016-006392

(51) Int. Cl.
*B23B 29/32*     (2006.01)
*G05B 19/27*     (2006.01)
(Continued)

(52) U.S. Cl.
CPC .............. *B23B 29/323* (2013.01); *B23B 1/00* (2013.01); *B23B 3/161* (2013.01); *G05B 19/27* (2013.01);
(Continued)

(58) Field of Classification Search
CPC ......... B23B 1/00; B23B 3/161; B23B 29/323; G05B 19/27; G05B 19/4063; G05B 2219/37355; G05B 2219/37621
See application file for complete search history.

(56) References Cited

U.S. PATENT DOCUMENTS 3,987,350 A * 10/1976 Pomella ............... G05B 19/182
                                                          318/571
4,090,281 A * 5/1978 Hautau ................. B23B 39/205
                                                              29/40
(Continued)

FOREIGN PATENT DOCUMENTS

JP           0241801 A     2/1990
JP           1058279 A     3/1998
(Continued)

OTHER PUBLICATIONS

Notification of Reasons for Refusal for Japanese Application No. 2016-006392, dated Dec. 5, 2017 with translation, 6 pages.

*Primary Examiner* — Jennifer L Norton
(74) *Attorney, Agent, or Firm* — RatnerPrestia

(57) ABSTRACT

A numerical controller includes a command analysis unit that generates movement command data by analyzing a program command and an axis travel calculation unit that, when the program command commands movement of a tool in a direction of a first straight axis orthogonal to an axis of rotation of a workpiece, converts a command value based on the program command for the movement of the tool in the direction of the first straight axis into a command value for a rotation angle of a turret, and a position of the tool is controlled in accordance with a rotation command for the turret based on the command value for the rotation angle of the turret calculated by the axis travel calculation unit, instead of the command based on the program command for the movement in the direction of the first straight axis.

4 Claims, 10 Drawing Sheets

(51) Int. Cl.
*G05B 19/4063* (2006.01)
*B23B 1/00* (2006.01)
*B23B 3/16* (2006.01)

(52) U.S. Cl.
CPC .............. *G05B 19/4063* (2013.01); *G05B 2219/37355* (2013.01); *G05B 2219/37621* (2013.01)

(56) References Cited

U.S. PATENT DOCUMENTS

| | | | | |
|---|---|---|---|---|
| 4,899,094 | A * | 2/1990 | Pilborough | G05B 19/4015 318/567 |
| 5,815,400 | A * | 9/1998 | Hirai | G05B 19/401 700/173 |
| 5,842,392 | A * | 12/1998 | Pfeifer | B23B 3/168 82/1.11 |
| 5,974,643 | A * | 11/1999 | Hays | B23Q 17/2233 29/39 |
| 6,775,586 | B2 * | 8/2004 | Shibata | G05B 19/41 409/183 |
| 7,869,897 | B2 * | 1/2011 | Otsuki | G05B 19/404 700/159 |
| 2006/0111019 | A1 * | 5/2006 | Hyatt | B23B 1/00 451/6 |
| 2009/0214313 | A1 | 8/2009 | Kato et al. | |
| 2011/0080673 | A1 * | 4/2011 | Aoshima | B21D 53/10 360/224 |
| 2012/0065768 | A1 | 3/2012 | Sakata | |
| 2014/0114465 | A1 * | 4/2014 | Terada | G05B 19/4083 700/194 |
| 2015/0134101 | A1 * | 5/2015 | Iuchi | G05B 19/4086 700/160 |
| 2015/0151445 | A1 * | 6/2015 | Masumiya | A47J 47/005 83/875 |
| 2015/0227130 | A1 | 8/2015 | Terada et al. | |
| 2016/0224006 | A1 * | 8/2016 | Otomo | G05B 19/18 |
| 2017/0008109 | A1 * | 1/2017 | Wuerfel | B23F 23/1225 |
| 2017/0113313 | A1 * | 4/2017 | Aoyagi | B23Q 5/10 |
| 2017/0131692 | A1 * | 5/2017 | Kawai | G05B 19/4063 |
| 2017/0160722 | A1 * | 6/2017 | Kawai | G05B 19/4063 |
| 2018/0117681 | A1 * | 5/2018 | Aoyagi | B23B 29/323 |
| 2018/0369978 | A1 * | 12/2018 | Persico | B23B 3/32 |
| 2019/0201988 | A1 * | 7/2019 | Ibarra Garces | B23C 3/06 |

FOREIGN PATENT DOCUMENTS

| | | |
|---|---|---|
| JP | 2009-190157 | 8/2009 |
| JP | 5287986 B2 | 6/2013 |
| WO | 2013088884 A1 | 6/2013 |
| WO | 2014038101 A1 | 3/2014 |

* cited by examiner

↓ ROTATE TURRET -90°
FOR TOOL CHANGE

NUMERICAL CONTROLLER HAVING CUTTING CONTROL FUNCTION THROUGH TURRET ROTATION

BACKGROUND OF THE INVENTION

1. Field of the Invention

The present invention relates to a numerical controller and particularly relates to a numerical controller that has a cutting control function through turret rotation.

2. Description of the Related Art

In an ordinary lathe, having a straight axis (generally referred to as X axis) that makes a cutter move in radial directions with respect to a work, control over depth of cut is carried out through straight-line movement by the X axis. Meanwhile, machine tools preferably have small number of axes for reduction in costs and sizes. A cost reduction effect and/or a size reduction effect are obtained if the depth of cut can be controlled without use of a straight-line movement mechanism for the X axis and if the straight-line movement mechanism for the X axis can be omitted.

Prior art techniques in which the depth of cut is controlled by means other than the straight-line movement mechanism for the X axis include techniques disclosed in Japanese Patent No. 5287986 and Japanese Patent Application Laid-Open No. 2009-190157. In these techniques, cutting work is performed on a workpiece that does not rotate, by controlling a tool so that it revolves around the workpiece, an eccentric rotation part that holds the tool on a first rotation table is provided in addition to a spindle rotation part that faces a chuck which fixes the workpiece and that rotates as a spindle, and the depth of cut is controlled based on rotation control over the eccentric rotation part.

These techniques, however, are intended for machines of types in which the tool revolves around the fixed workpiece and the machines of such types have problems in that necessary tool change is troublesome because of impossibility to attach a plurality of tools thereto. On the other hand, a machine with a turret to which a plurality of tools can be attached is of a type in which a rotating workpiece is turning-machined by pressing a tool attached to the turret against the rotating workpiece and it is impossible to simply apply the techniques disclosed in Japanese Patent No. 5287986 and Japanese Patent Application Laid-Open No. 2009-190157 described above to the machines of the type.

SUMMARY OF THE INVENTION

An object of the present invention is to provide a numerical controller that enables control for turning without use of a straight-line movement mechanism for X axis in a machine with a turret to which one or more tools can be attached.

In the numerical controller of the invention, as illustrated in FIGS. 1 and 2, for a machine of a type in which a rotating workpiece is machined by pressing a tool attached to a turret against the rotating workpiece, turning work is carried out, instead of straight-line movement of X axis, by calculating a rotation angle of the turret for attainment of a desired X axis coordinate value when a movement command related to X axis is executed and controlling the turret so that a rotation angle of the turret becomes θ, by using a relational expression among a direct distance (X in FIG. 2) from a center of the workpiece to an edge of the tool, a turret rotation angle (θ in FIG. 2), and a distance (R in FIG. 2) from a center of the turret to the edge of the tool, without using straight-line movement.

The numerical controller according to the invention is configured to control a machine which carries out machining of a rotating workpiece by pressing a tool attached to a turret against the rotating workpiece, based on a program command, and the numerical controller includes a command analysis unit that generates movement command data by analyzing the program command and an axis travel calculation unit that, when the movement command data generated by the command analysis unit is a movement command data for moving the tool in a direction of a first straight axis orthogonal to an axis of rotation of the workpiece, converts a command value based on the program command for the movement of the tool in the direction of the first straight axis into a command value for the rotation angle of the turret. The numerical controller controls a position of the tool in accordance with a rotation command for the turret based on the command value for the rotation angle of the turret calculated by the axis travel calculation unit, instead of a command based on the program command for the movement in the direction of the first straight axis.

A plurality of tools may be attached to the turret, a rotatable angle of the turret for restriction on the rotation angle of the turret and a position of the turret in Z axis direction suitable to change of the tool in use of the tool for the machining may be set in advance for each of the plurality of tools, and, when the program command is a command for change of the tool for use in the machining, movement to the position of the turret in the Z axis direction suitable to the change of the tool and switching of the rotatable angle of the turret to the rotatable angle of the turret set for the tool after the change may be carried out.

The machine may have a second straight axis that enables relative movement of a position of the workpiece and a position of the turret in a direction orthogonal to an axis of rotation of the workpiece and orthogonal to the first straight axis, the axis travel calculation unit may calculate a command value for the second straight axis so that the turret is moved to a position where the tool for use in the machining can cut in to a position of rotation center of the workpiece by means of only rotation of the turret, and the numerical controller may control the relative positions of the workpiece and the turret based on the command value for the second straight axis.

The machine may have the second straight axis that enables the relative movement of the position of the workpiece and the position of the turret in the direction orthogonal to the axis of rotation of the workpiece and orthogonal to the first straight axis and an angle formed between the tool and a radial direction of the workpiece when the tool for use in the machining is pressed against the workpiece by rotation of the turret may be changeable by movement of the second straight axis for change in a life of the tool or cutting resistance.

The invention enables omission of the straight-line movement mechanism for the X axis in a machine with a turret to which one or more tools can be attached and contributes to reduction in costs and sizes of the machine.

DETAILED DESCRIPTION OF THE PREFERRED EMBODIMENTS

First Embodiment

A numerical controller according to a first embodiment controls rotation of a turret so as to attain a commanded straight-line depth of cut in X axis direction which is a first straight-line direction orthogonal to a rotation axis of a workpiece.

Figure 1:
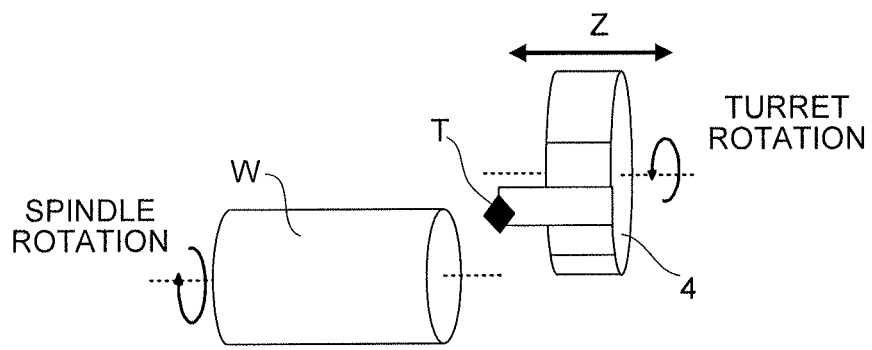
FIG. 1 is a diagram illustrating a machine of a type which is controlled by a numerical controller of the invention and in which a rotating workpiece is machined by pressing a tool attached to a turret against the rotating workpiece.
Figure 2:
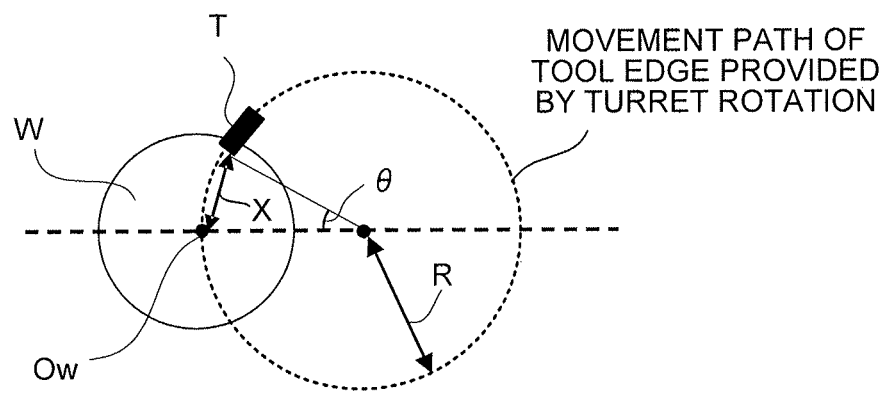
FIG. 2 is a diagram illustrating control over depth of cut into the workpiece that is carried out based on a rotation angle of the turret by the numerical controller of the invention and that is.

As illustrated in FIGS. 1 and 2, a controlled object of the numerical controller is a machine of a type in which a rotating workpiece W is machined by pressing a tool T attached to the turret 4 against the rotating workpiece W. Straight-line movement in Z axis direction and rotation angle control can be performed for the turret 4 and the turret 4 has no straight-line movement mechanism other than that for the Z axis direction. The workpiece W rotates as a spindle. Though ordinary lathes are provided with mechanisms that cause straight-line movement of the turret in the Z axis direction and other directions, such mechanisms are made unnecessary in the machines that are controlled by the numerical controller of the embodiment.

As illustrated in FIG. 2, θ denotes the turret rotation angle and the turret rotation angle at which an edge of the tool is positioned at center Ow of the workpiece W is defined as 0. Besides, X denotes a direct distance from the center of the workpiece to the edge of the tool and a radius of the workpiece W having undergone cutting is equal to the distance. In a machining program, usually, a radius value or a diameter value of a workpiece having undergone cutting is commanded in such a format as "X10.0." Further, R denotes a distance from center of the turret to the edge of the tool, and is a fixed value determined based on a mechanical structure.

In the numerical controller of the embodiment, the rotation angle θ of the turret 4 is controlled so that a value of X in FIG. 2 may reach a command value for X axis straight-line movement commanded in the machining program. In order that the tool may be moved to a position where X=0 holds through control over the rotation angle θ of the turret 4, the center of the workpiece W is required to be positioned on a movement path of the edge of the tool that is provided by the rotation of the turret, as illustrated in FIG. 2.

In such a mechanical structure, relation between X and θ is expressed in equation (1) stated below. A solution of equation (1) for θ is expressed in equation (2) stated below.

$$X = 2R\sin\frac{\theta}{2} \quad (1)$$

$$\theta = 2\sin^{-1}\frac{X}{2R} \quad (2)$$

In the numerical controller of the embodiment, the command value for the X axis is converted into a command value θ of the rotation angle of the turret 4 with use of the equation (2).

Figure 3:
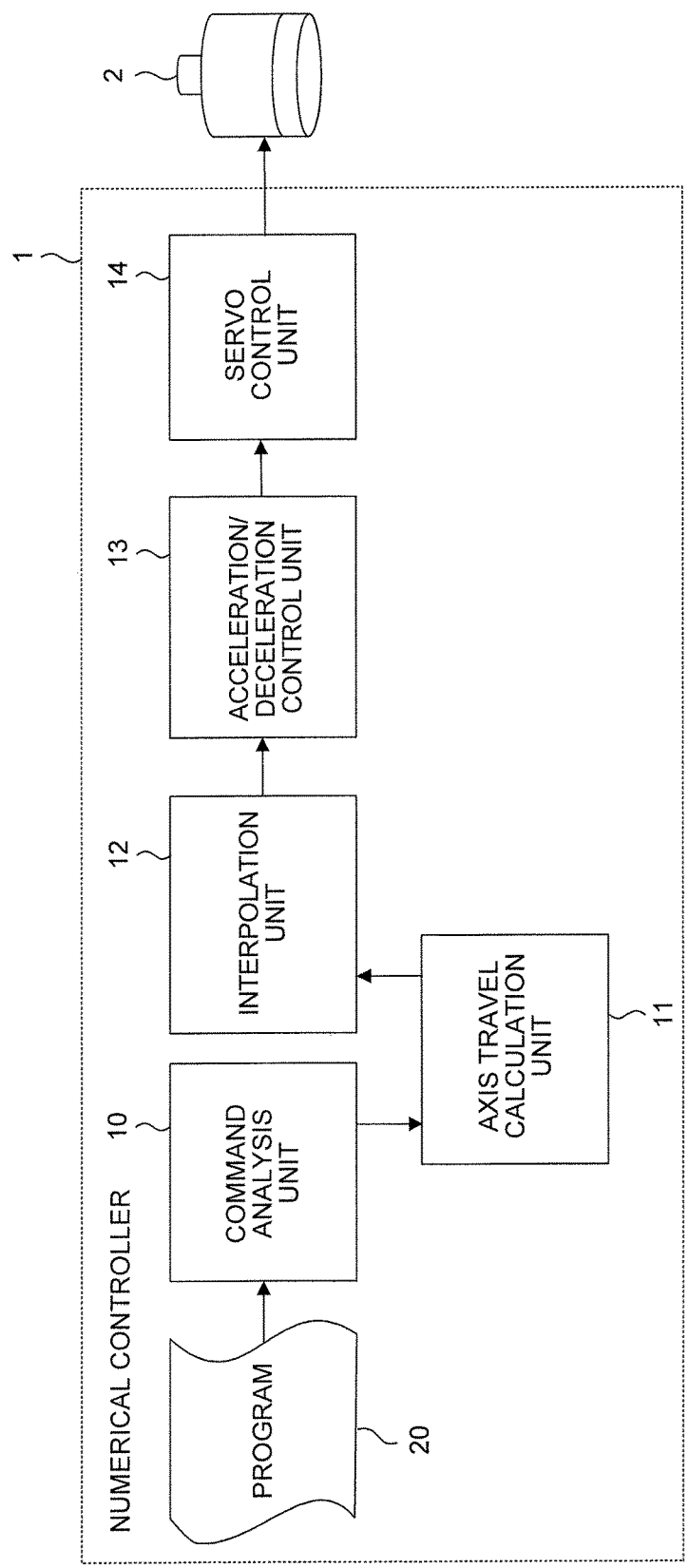
FIG. 3 is a functional block diagram of a numerical controller according to a first embodiment of the invention.

FIG. 3 is a functional block diagram of the numerical controller according to the embodiment.

The numerical controller 1 of the embodiment includes a command analysis unit 10, an axis travel calculation unit 11, an interpolation unit 12, an acceleration/deceleration control unit 13, and a servo control unit 14.

The command analysis unit 10 sequentially reads out and analyzes blocks including commands for travels of axes from a program 20 stored in a memory not illustrated, prepares movement command data to command movement of the axes based on results of such analysis, and outputs the prepared movement command data to the axis travel calculation unit 11.

When a command based on the movement command data received from the command analysis unit 10 is related to the X axis, the axis travel calculation unit 11 converts the command value for the X-axis based on the movement command data into the command value θ of the rotation angle of the turret 4 with use of equation (2) as described above and outputs the converted movement command data to the interpolation unit 12. When the radius value as the command value is 5.0 [mm] and when R is 20.0 [mm], for instance, θ is approximately 7.18 [deg]. When no solution exists for equation (2) in such cases where the radius value as the command value is 100.0, for instance, error handling such as alarm generation is carried out.

The interpolation unit 12 generates data resulting from interpolation calculation of points on a command path at an interpolation cycle based on a movement command given pursuant to the movement command data the axis travel calculation unit 11 outputs.

The acceleration/deceleration control unit 13 carries out an acceleration/deceleration process based on the interpolation data the interpolation unit 12 outputs, calculates speeds of the drive axes for each interpolation cycle, and outputs the interpolation data, to which results of such calculation have been applied, to the servo control unit 14.

The servo control unit 14 controls servo motors 2 for the axes of the machine that is a controlled object, based on output of the acceleration/deceleration control unit 13.

Figure 4:
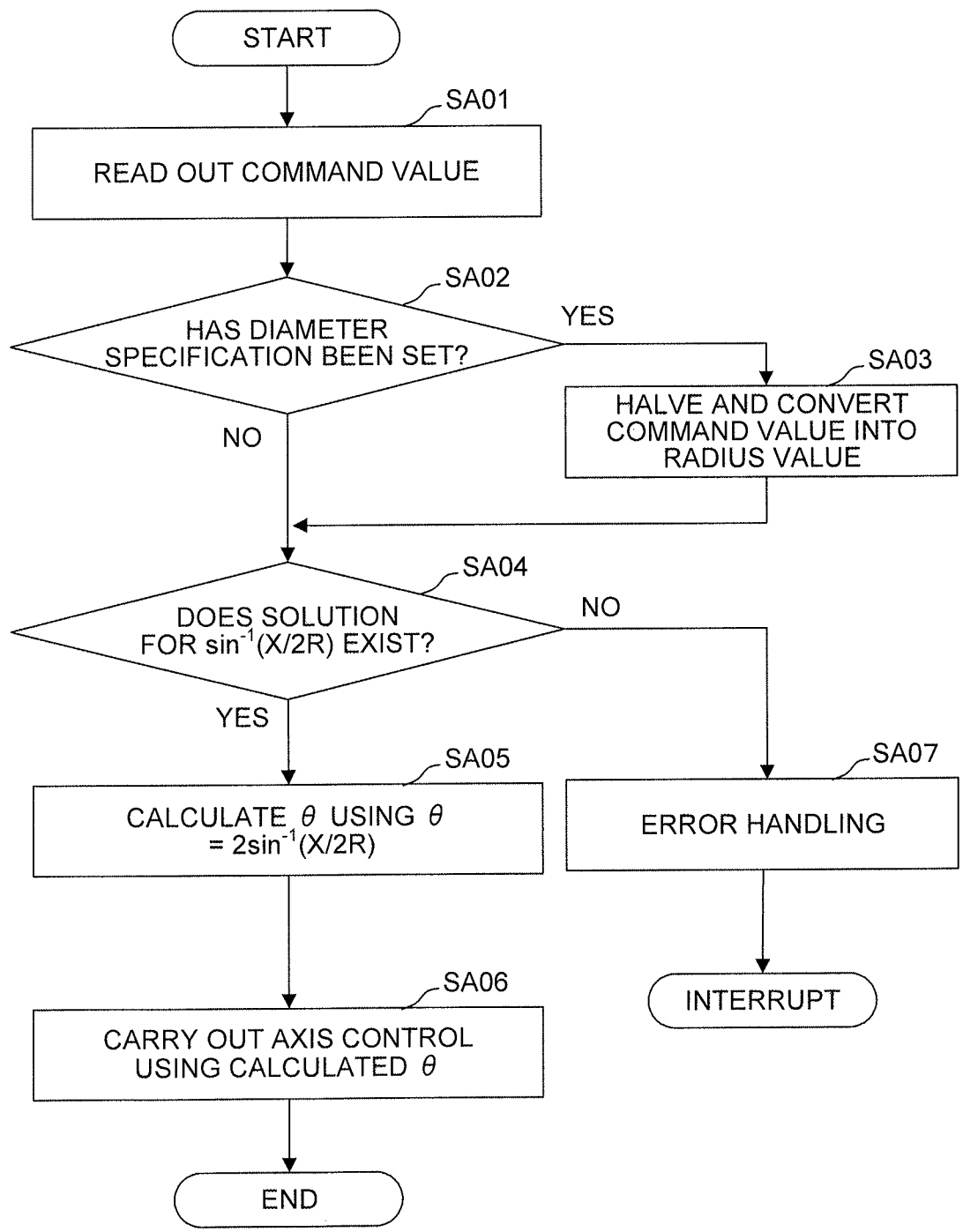
FIG. 4 is a flow chart for processes that are executed on the numerical controller of FIG. 1.

FIG. 4 is a flow chart illustrating flow of processes that are executed on the numerical controller 1 of the embodiment. The description will be given in line with each step of the flowchart.

[Step SA01] The command analysis unit 10 sequentially reads out and analyzes the blocks including the commands for the travels of the axes from the program 20 stored in the memory not illustrated, prepares the movement command data to command the movement of the axes based on the results of such analysis, and outputs the prepared movement command data to the axis travel calculation unit 11.

[Step SA02] The axis travel calculation unit 11 determines whether the command value for the X axis commands the diameter value of the workpiece or commands the radius value of the workpiece. The process proceeds to Step SA03 if the command value for the X axis commands the diameter value of the workpiece, or the process proceeds to Step SA04 if the command value for the X axis commands the radius value of the workpiece.

[Step SA03] The axis travel calculation unit 11 halves the command value for the X axis to convert the command value into the radius value.

[Step SA04] The axis travel calculation unit 11 performs a calculation using equation (2) based on the given command value for the X axis and determines whether the solution of equation (2) exists or not. The process proceeds to Step SA05 if the solution of equation (2) exists, or the process proceeds to Step SA07 if the solution of equation (2) does not exist.

[Step SA05] The axis travel calculation unit 11 performs a calculation using equation (2) based on the given command value for the X axis and thereby calculates the rotation angle $\theta$ of the turret 4.

[Step SA06] Based on the movement command data to which the rotation angle $\theta$ of the turret 4 calculated by the axis travel calculation unit 11 in Step SA05 is applied, the interpolation unit 12 and the acceleration/deceleration control unit 13 carry out an interpolation process and the acceleration/deceleration process and the servo control unit 14 controls the servo motors 2 for the axes based on results of the processes, so that the process is ended.

[Step SA07] The axis travel calculation unit 11 gives an operator a command stating that the given command value for the X axis cannot be converted into the rotation angle $\theta$ of the turret 4 and interrupts machining processes.

Figure 5:
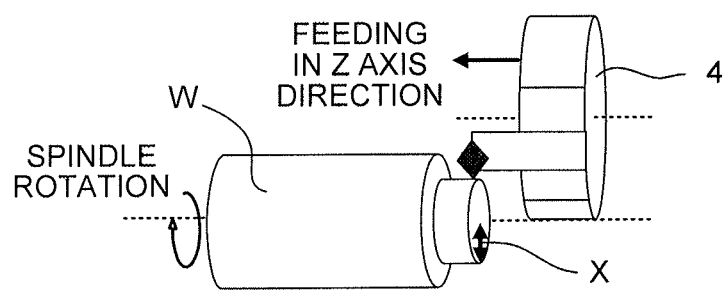
FIG. 5 is a diagram illustrating a process of machining in the machine with the turret that is controlled by the numerical controller of FIG. 1.

Thus the servo control unit 14 controls the servo motors 2 for driving and rotating the turret 4 so that the rotation angle $\theta$ of the turret 4 may have the value $\theta$ calculated pursuant to the processes illustrated in the flow chart of FIG. 4 and the direct distance from the center of the workpiece to the edge of the tool consequently has a desired value. By feeding of the turret 4 in the Z axis direction in a state in which the direct distance from the center of the workpiece to the edge of the tool has the desired value, cutting to a desired depth of cut can be attained as illustrated in FIG. 5.

Second Embodiment

A numerical controller according to a second embodiment controls a machine in which a plurality of tools are attached to a turret.

Usually, the plurality of tools are attached to the turret and tool change is carried out with the turret rotated. For the tool change, in the numerical controller of the embodiment, switching control of a rotatable angle of the turret, movement of the turret to a position suitable to the tool change, and auto-change control over the value of the rotation angle $\theta$ of the turret are carried out. A functional block diagram of the numerical controller according to the embodiment is similar to the functional block diagram illustrated in FIG. 3 of the numerical controller according to the first embodiment.

Hereinbelow, details of the control that is carried out by the above-mentioned numerical controller of the embodiment will be described.

Figure 6:
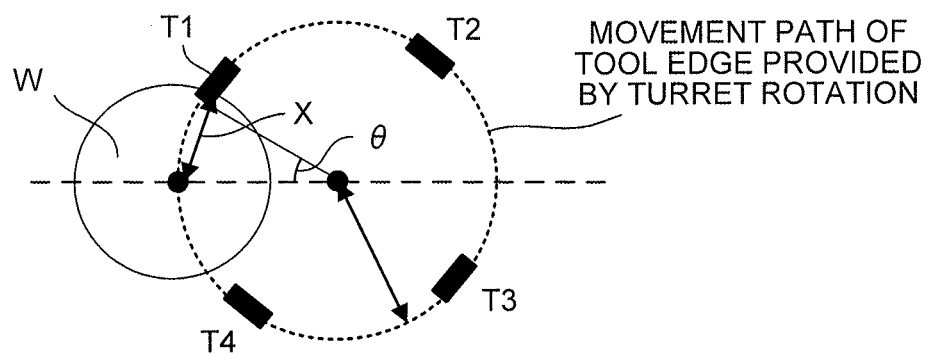
FIG. 6 is a diagram illustrating a turret provided with a plurality of tools.

The switching control of the rotatable angle of the turret 4 for the tool change is carried out in order to ensure safety during tool switching and to enable tool change operations. For instance, it is assumed that a front view of the turret 4 is as illustrated in FIG. 6 in which four tools (first tool T1, second tool T2, third tool T3, and fourth tool T4) are attached to the turret 4.

Figure 7:
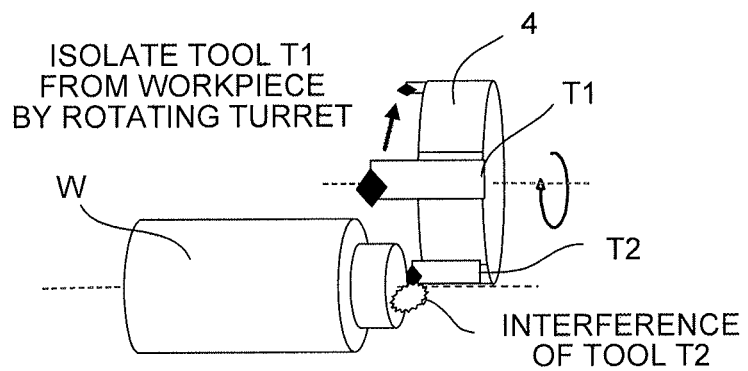
FIG. 7 is a diagram illustrating interference between the tools and the workpiece that may occur in the turret provided with the plurality of tools.

When the turret 4 is rotated in order to isolate the first tool T1 from the workpiece W during machining with use of the first tool T1 in this configuration, as illustrated in FIG. 7 for instance, too large rotation angle may cause the second tool T2 to interfere with the workpiece W.

During a cutting operation, therefore, the rotation of the turret 4 is controlled with the rotation angle $\theta$ of the turret 4 restricted within a safe range. The safe range of the rotation angle $\theta$ of the turret 4 is determined differently for each tool in accordance with a mechanical structure and the ranges of such restriction are respectively set as parameters in advance for the tools. In case where any deviation from the set range occurs, an alarm is generated.

Figure 8:
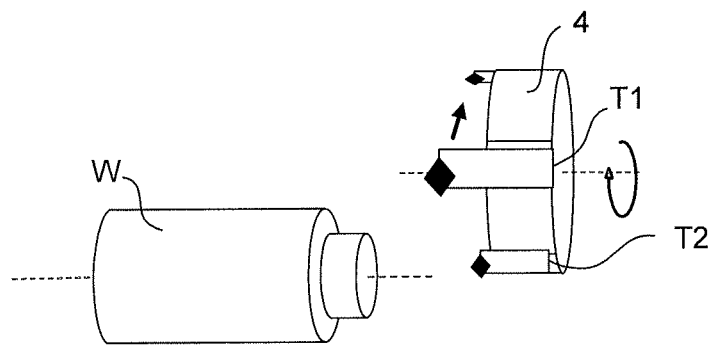
FIG. 8 is a diagram illustrating tool change in use of the turret provided with the plurality of tools.

On the other hand, the tool change is usually carried out with the turret 4 isolated from the workpiece W as illustrated in FIG. 8 and then interference between the workpiece W and the tools T is prevented irrespective of the rotation angle of the turret 4. During the tool change operation, therefore, the turret 4 is rotated without the restriction on the rotation angle of the turret 4 because any restriction on the rotation angle $\theta$ of the turret 4 inhibits the tool change operation.

The movement of the turret 4 to the position suitable to the tool change is carried out in order to increase the safety during the tool switching operation and in order to reduce burdens on the operator. When the tool change is commanded, movement of the workpiece W and the tools T1 and T2 to positions isolated in the Z axis direction as illustrated in FIG. 8 is automatically performed so that the tool change is carried out in the safe position even if the operator does not give a movement command in the Z axis direction. This is attained by previous setting of a Z axis coordinate of the position suitable to the tool change as a parameter and by the automatic movement to the position upon the command for the tool change.

Figure 9A:
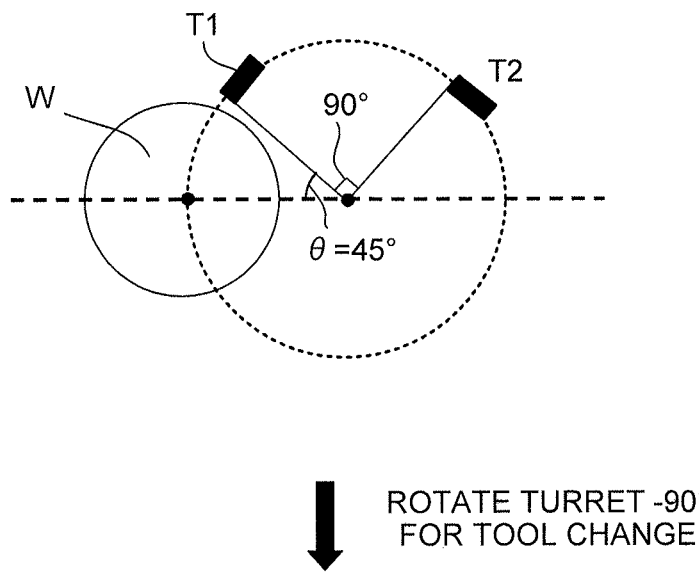
FIGS. 9A and 9B are diagrams illustrating auto-change control over a value of a rotation angle θ of the turret in a numerical controller according to a second embodiment of the invention.
Figure 9B:
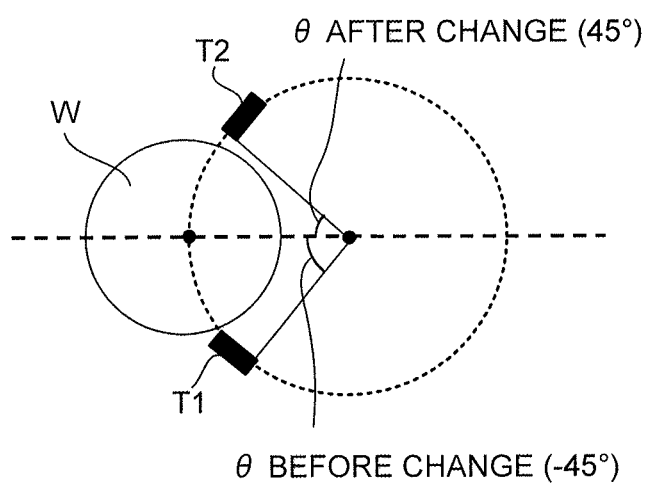

The auto-change control over the value of the rotation angle θ of the turret is carried out in order to reduce the burdens on the operator. For instance, it is assumed that the value of θ is 45° as illustrated in FIG. 9A while the first tool T1 is selected. It is also assumed that a difference in angle between the edges of the first tool T1 and the second tool T2 is 90°. When the turret is rotated by −90° for change from the first tool T1 to the second tool T2 in this state, the value of θ after such rotation becomes −45° on condition that θ remains being the angle for the first tool T1, as illustrated in FIG. 9B. After the tool change, however, the value of θ needs to be changed so that θ becomes the angle for the second tool T2, in order that cutting may be performed by the second tool T2. In order to change θ from the angle for the first tool T1 to the angle for the second tool T2, 90° (difference between the angle for the first tool T1 and the angle for the second tool T2) should be added to the angle for the first tool T1. In an example of FIGS. 9A and 9B, as the angle θ for the first tool T1 before the change is −45°, the angle θ for the first tool T1 after the change is 45°, which is obtained by adding 90° to −45°, and the θ represents the angle for the second tool T2. Differences between the angles for the tools are set as parameters in advance. By automatic readout of the difference between the angles for the tools according to the parameters during the tool change and setting of the readout value (difference) as the value of θ, necessity for the operator to give a command for changing the value of θ is eliminated and thus the burdens on the operator are reduced.

Figure 10:
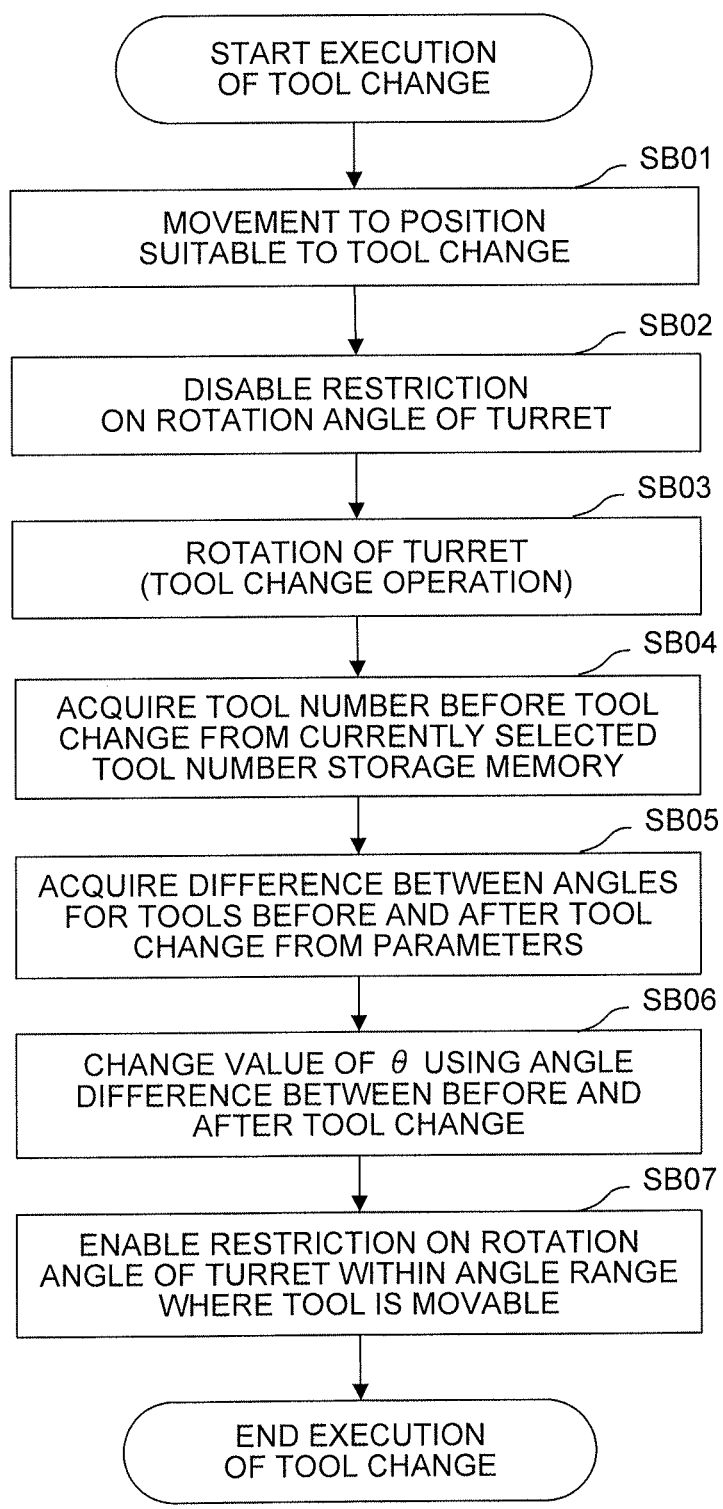
FIG. 10 is a flow chart illustrating a movement of the turret to a position suitable to tool change at the time of tool change, a switching control process for a rotatable angle of the turret, and the auto-change control process over the value of the rotation angle θ of the turret, which are carried out on the numerical controller according to the second embodiment of the invention.

FIG. 10 is a flow chart illustrating flow of processes that are executed on the numerical controller 1 in the switching control of the rotatable angle of the turret and the auto-change control over the value of the rotation angle θ of the turret during the tool change. The description will be given in line with each step of the flowchart.

[Step SB01] The command analysis unit 10 reads out a tool change command from the program 20, then reads out a position in the Z axis direction that is suitable to the tool change and that is set as the parameter, and prepares the movement command data for the position. The servo control unit 14 controls the servo motor 2 that drives the turret 4 in the Z axis direction and thereby moves the turret 4 to the position suitable to the tool change.

[Step SB02] Upon readout of the tool change command from the program 20, the command analysis unit 10 disables the restriction so that the turret 4 which has made rotating motions only within the angle range may freely move 360°. Thus the tool change operation is enabled.

[Step SB03] Based on the movement command data on the tool change that has been prepared by the command analysis unit 10, the servo control unit 14 controls the servo motor 2 that drives the turret 4 and thereby carries out the tool change.

[Step SB04] Tool numbers before and after the tool change are acquired. A currently selected tool number is stored in a memory upon each tool change and the tool number before the tool change is acquired from the memory. The tool number after the tool change can be acquired from a command value because a usual command for tool selection has a format including a tool number, such as T0001.

[Step SB05] The difference between the angle for the tool before the tool change and the angle for the tool after the tool change is acquired based on the tool numbers before and after the tool change, which are acquired in Step SB04. The differences between the angles for the tools are set as the parameters in advance and the difference between the angles before and after the tool change is acquired from the parameter setting values with use of the tool numbers before and after the tool change, which are acquired in Step SB04.

[Step SB06] The difference between the angles for the tools, acquired in Step SB05, is added to the current rotation angle θ of the turret 4 and a resultant value is set as the new rotation angle θ of the turret 4. Thus the rotation angle θ of the turret 4 is changed from the value of the angle for the tool before the tool change to the value of the angle for the tool after the tool change.

[Step SB07] The angle range within which the tool after the tool change is movable is acquired from the parameter setting values. Then the restriction on the rotation angle of the turret 4 is enabled within the acquired angle range, so that the turret 4 may be rotated within the safe range.

Third Embodiment

Figure 11:
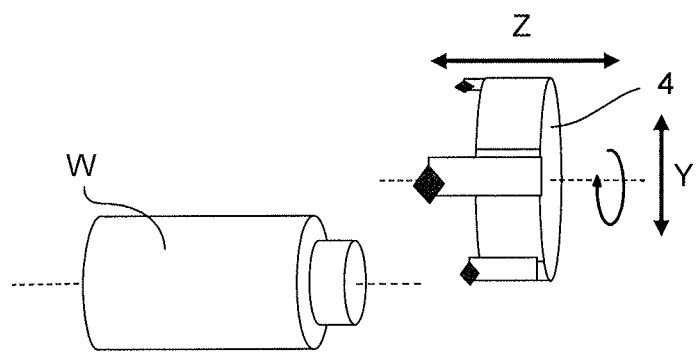
FIG. 11 is a diagram illustrating a machine including a mechanism that causes straight-line movement of the turret in Y axis direction.

The first and second embodiments described above are intended for machines that allow the straight-line movement of the turret 4 only in the Z axis direction. Provided that a mechanism which causes straight-line movement of the turret 4 in Y axis direction perpendicular to the Z axis direction can be added thereto as illustrated in FIG. 11, the edge of the tool can be made to pass through the center Ow of the workpiece even if the distances from the center of the turret to the edges of the tools are different, and an inclination of the tool in contact with the workpiece W can be changed. A functional block diagram of a numerical controller according to the embodiment is similar to the functional block diagram illustrated in FIG. 3 of the numerical controller according to the first embodiment.

Hereinbelow, details of control that is carried out by the above-mentioned numerical controller of the embodiment will be described.

Figure 12:
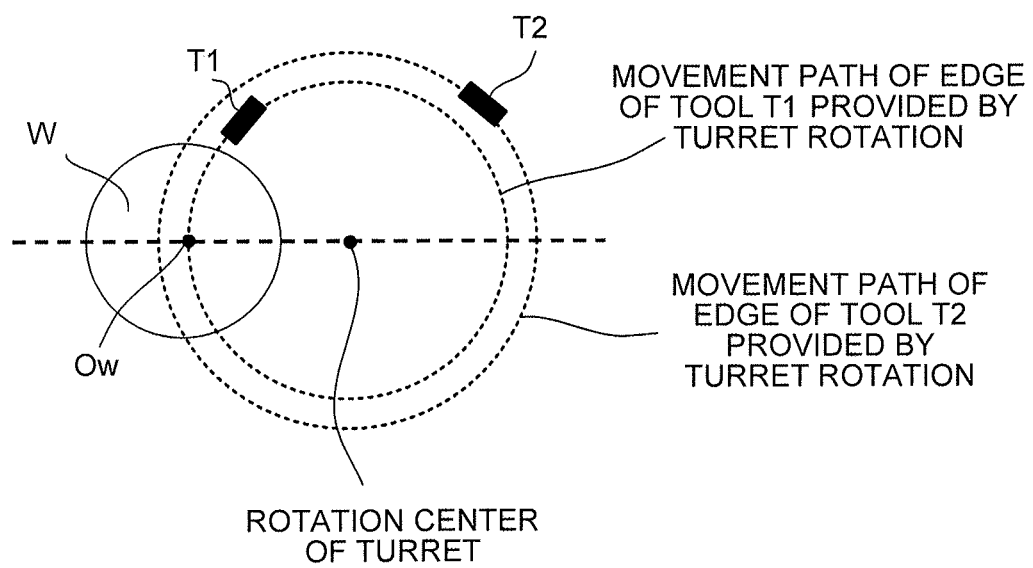
FIG. 12 is a diagram illustrating status in which distances from center of the turret to edges of the tools attached to the turret are different.

Control that makes the edge of the tool pass through the center of the workpiece even if the distances from the center of the turret to the edges of the tools are different is carried out in order to cope with difference in the distances from the center of the turret to the tools (first tool T1 and second tool T2) as illustrated in FIG. 12. In FIG. 12, the second tool T2 is more distant from the center of the turret than the first tool T1 is. In this state, the movement path of the edge of the first tool T1 that is provided by the rotation of the turret passes through the center of the workpiece and the movement path of the edge of the second tool T2 does not pass through the center of the workpiece.

In order that cutting to the center of the workpiece may be enabled, however, the center of the workpiece is required to be positioned on the movement path of the edge of the tool that is provided by the rotation of the turret, as described for the first embodiment. For the change to the second tool T2, accordingly, the turret 4 is moved in the Y axis direction perpendicular to the Z axis direction so that the center of the workpiece may be positioned on the movement path of the edge of the tool that is provided by the rotation of the turret, as illustrated in FIG. 13.

Figure 13:
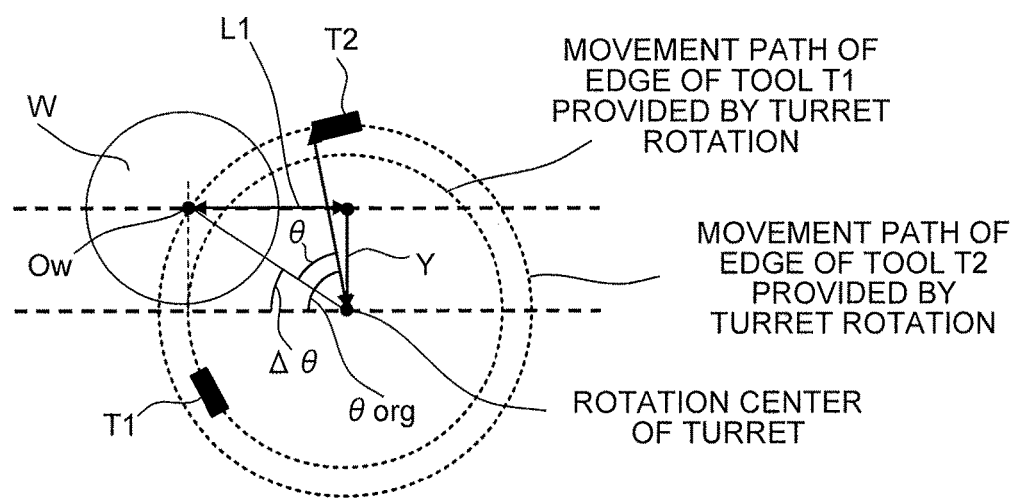
FIG. 13 is a diagram illustrating control that makes an edge pass through center of the workpiece even if the distances from the center of the turret to the edges of the tools are different in a numerical controller according to a third embodiment of the invention.
Figure 14:
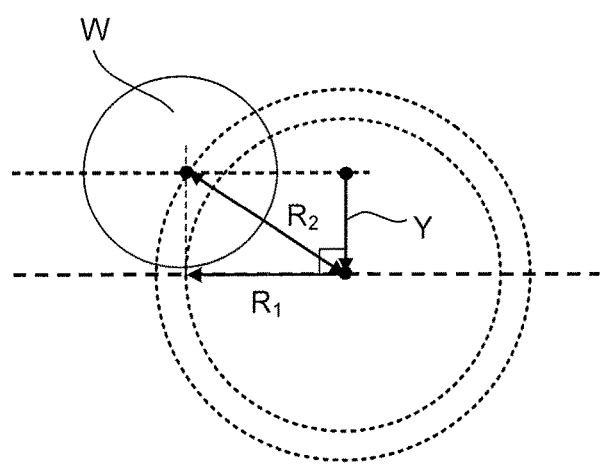
FIG. 14 is a diagram illustrating relation among a distance R1 from the center of the turret to the edge of a first tool, a distance R2 from the center of the turret to the edge of a second tool, and a travel distance Y for the Y axis.

A travel of the turret 4 in the Y axis direction that is required for attainment of positional relation in FIG. 13 is obtained from equation (3) below because relation among a distance R1 from the center of the turret to the edge of the first tool T1, a distance R2 from the center of the turret to the edge of the second tool T2, and a travel distance Y for the Y axis is as illustrated in FIG. 14.

$$Y=\sqrt{R_2^2-R_1^2} \tag{3}$$

For the change from the first tool T1 to the second tool T2, movement of the Y axis by the travel calculated by the equation causes the center of the workpiece W to be positioned on the movement path of the edge of the tool that is provided by the rotation of the turret.

Figure 15:
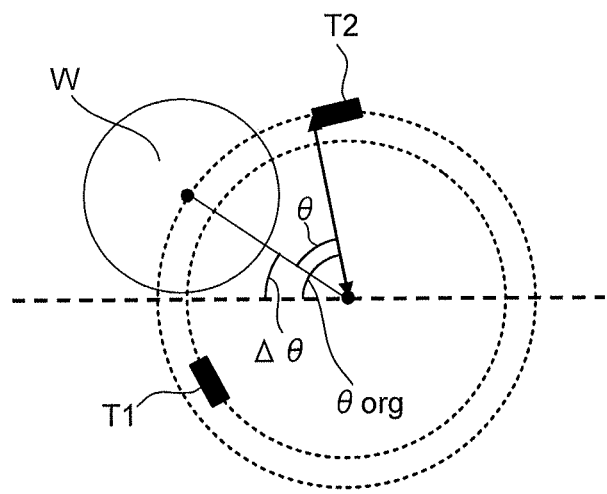
FIG. 15 is a diagram illustrating values of the rotation angle θ of the turret in accordance with movement of the Y axis.

When equation (1) and equation (2), described for the first embodiment, are used with the movement of the Y axis, the value of θ needs to be changed so as to coincide with an angle illustrated in FIG. 15. Such a change can be calculated by equation (4) stated below.

$$\theta = \theta org - \Delta\theta = \theta org - \cos^{-1}\frac{R_1}{R_2} \quad (4)$$

Here, θorg denotes the value of θ in a state before movement of the turret in the Y axis direction. When the turret is moved in the Y axis direction, the change in the value of θ in accordance with equation (4) makes the value of θ coincide with the angle illustrated in FIG. 15.

Figure 16:
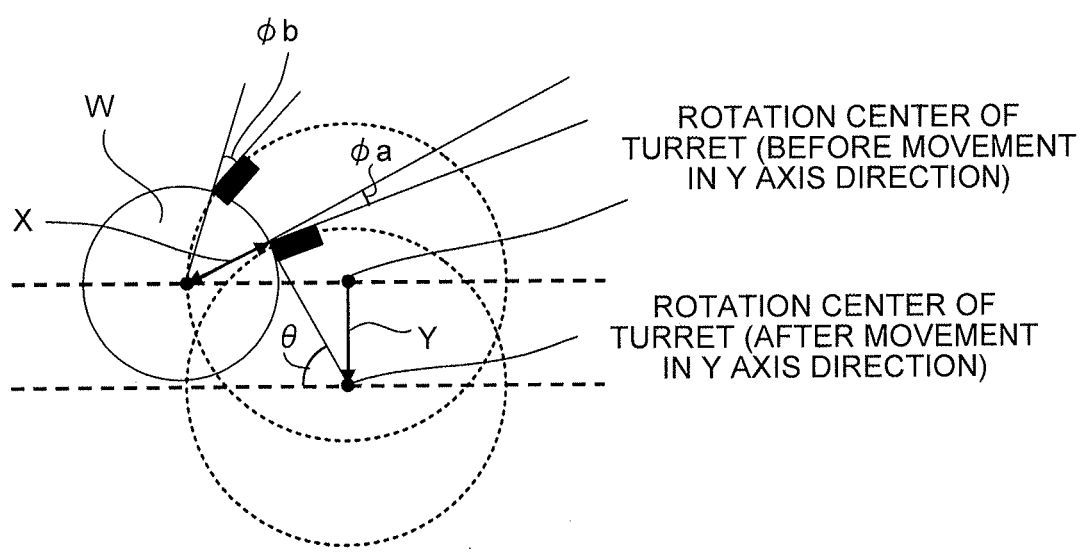
FIG. 16 is a diagram illustrating control for changing an inclination of the tool in contact with the workpiece in the numerical controller according to the third embodiment of the invention.

Meanwhile, control for changing the inclination of the tool in contact with the workpiece W is carried out therein so that the movement of the turret in the Y axis direction may make the center of the workpiece deviate from the movement path of the edge of the tool that is provided by the rotation of the turret, as illustrated in FIG. 16. By the control, an angle ($\phi_a$, $\phi_b$ in FIG. 16) formed between a radial direction of the workpiece and a direction of the tool can be changed so that a manner of contact of the tool with the workpiece can be changed.

The angle formed between the radial direction of the workpiece and the direction of the tool relates to a life of the tool, cutting resistance, and the like and thus change in the angle may extend the life of the tool.

With definitions of the distance from the center of the workpiece to the edge of the tool after the movement of the turret in the Y axis direction as a variable X, the travel distance of the turret in the Y axis direction as Y, and the turret rotation angle as θ, as illustrated in FIG. 16, relation among the variables stated by equation (5) below holds.

$$\theta = \cos^{-1}\frac{Y^2 + 2R^2 - X^2}{2R\sqrt{Y^2 + R^2}} + \tan^{-1}\frac{Y}{R} \quad (5)$$

Herein, the operator specifies the travel of the Y axis, using the machining program. When a command for the value of X is given by the machining program in a state in which the turret has been moved in the Y axis direction, the distance from the center of the workpiece to the edge of the tool can be made to coincide with the command value by calculation of θ in accordance with the equation and by the control for attainment of the rotation angle of θ of the turret.

When this method is applied, the cutting to the center of the workpiece cannot be attained because the center of the workpiece is not on the movement path of the edge of the tool that is provided by the rotation of the turret and thus a machinable range is limited. In case where the command for the value of X that cannot be attained is given, error handling such as alarm generation is carried out.

Though the embodiments of the invention have been described above, the invention is not limited to examples of the embodiments described above and can be embodied in various manners with appropriate modification. Though the turret is moved in the Z axis direction in the above examples, the invention can be implemented in examples such as automatic lathe in which a workpiece is moved in the Z axis direction and in which a turret is not moved in the Z axis direction, for instance.

The invention claimed is:

1. A numerical controller that controls a machine which carries out machining of a rotating workpiece by pressing a tool attached to a turret against the rotating workplace, based on a program command, the numerical controller comprising:
   a processor configured to:
      generate movement command data by analyzing the program command, when the movement command data is a movement command data for moving the tool in a direction of a first straight axis orthogonal to an axis of rotation of the rotating workpiece indicating a depth of a cut into the rotating workpiece, determine that a command value based on the program command for the movement of the tool in the direction of the first straight axis commands a diameter value or radius value of the rotating workpiece,
      convert the command value based on the program command for the movement of the tool in the direction of the first straight axis into a command value for a rotation angle of the turret that positions the tool to cut the rotating workpiece to the depth based on the determined command value of the diameter value or the radius value of the rotating workpiece, and
      control a position of the tool by rotating the turret based on the command value for the rotation angle of the turret, without moving the turret in the direction of the first straight axis,
      wherein the processor is incapable of moving the turret in the direction of the first straight axis.

2. The numerical controller according to claim 1,
   wherein a plurality of tools are attached to the turret,
   wherein, for each of the plurality of tools, a rotatable angle of the turret for restriction on the rotation angle of the turret and a position of the turret in Z axis direction suitable to change of the tool in use of the tool for the machining are set in advance, and
   wherein, when the program command is a command for change of the tool for use in the machining, movement to the position of the turret in the Z axis direction suitable to the change of the tool and switching of the rotatable angle of the turret to the rotatable angle of the turret set for the tool after the change are carried out.

3. The numerical controller according to claim 1,
   wherein the machine has a second straight axis that enables relative movement of a position of the rotating workpiece and a position of the turret in a direction orthogonal to an axis of rotation of the rotating workpiece and orthogonal to the first straight axis,
   wherein the processor is further configured to calculate a command value for the second straight axis so that the turret is moved to a position where the tool for use in the machining can cut in to a position of rotation center of the rotating workpiece by means of only rotation of the turret, and
   wherein the numerical controller controls the relative positions of the rotating workpiece and the turret based on the command value for the second straight axis.

4. The numerical controller according to claim 1,
   wherein the machine has a second straight axis that enables relative movement of a position of the rotating workpiece and a position of the turret in a direction orthogonal to an axis of rotation of the rotating workpiece and orthogonal to the first straight axis, and
wherein an angle formed between the tool and a radial direction of the rotating workpiece when the tool for use in the machining is pressed against the rotating workpiece by rotation of the turret is changeable by movement of the second straight axis for change in a life of the tool or cutting resistance.

* * * * *